United States Patent
Byun et al.

(10) Patent No.: US 9,859,745 B2
(45) Date of Patent: Jan. 2, 2018

(54) WIRELESS POWER TRANSMITTER, WIRELESS POWER RECEIVER, AND METHOD FOR CONTROLLING SAME

(71) Applicant: Samsung Electronics Co., Ltd., Gyeonggi-do (KR)

(72) Inventors: Kang-Ho Byun, Gyeonggi-do (KR); Nam-Yun Kim, Seoul (KR); Hyuk-Choon Kwon, Seoul (KR); Ho-Dong Kim, Seoul (KR); Hae-Young Jun, Gyeonggi-do (KR); Soo-Yeon Jung, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 14/413,375

(22) PCT Filed: Jul. 10, 2013

(86) PCT No.: PCT/KR2013/006167
§ 371 (c)(1),
(2) Date: Jan. 7, 2015

(87) PCT Pub. No.: WO2014/010951
PCT Pub. Date: Jan. 16, 2014

(65) Prior Publication Data
US 2015/0180268 A1    Jun. 25, 2015

(30) Foreign Application Priority Data
Jul. 10, 2012    (KR) .................. 10-2012-0075098

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 17/00* (2013.01); *H02J 50/10* (2016.02); *H02J 50/90* (2016.02); *H02J 50/60* (2016.02)

(58) Field of Classification Search
USPC ......................................................... 320/108
See application file for complete search history.

(56) References Cited

U.S. PATENT DOCUMENTS

| 2010/0201189 A1 | 8/2010 | Kirby et al. |
| 2011/0221388 A1 | 9/2011 | Low et al. |

(Continued)

FOREIGN PATENT DOCUMENTS

| CN | 102318213 | 1/2012 |
| JP | 2012-10546 | 1/2012 |

(Continued)

OTHER PUBLICATIONS

PCT/ISA/237 Search Report issued on PCT/KR2013/006167 (pp. 3).

(Continued)

*Primary Examiner* — Robert Grant
(74) *Attorney, Agent, or Firm* — The Farrell Law Firm, P.C.

(57) ABSTRACT

Disclosed is a method for controlling a wireless power transmitter for transmitting charging power to a wireless power receiver. The control method of the present invention comprises the steps of: adjusting the internal impedance of the wireless power transmitter such that the impedance variation occurring when the wireless power receiver is positioned is set to a second impedance variation different from the first impedance variation; applying detection power for detecting the wireless power receiver; detecting the second impedance variation during the application of the detection power so as to detect the wireless power receiver;

(Continued)

and changing the impedance variation occurring when the wireless power receiver is positioned from the second impedance variation to the first impedance variation.

25 Claims, 9 Drawing Sheets

(51) Int. Cl.
*H02J 17/00* (2006.01)
*H02J 50/10* (2016.01)
*H02J 50/90* (2016.01)
*H02J 50/60* (2016.01)

(56) References Cited

U.S. PATENT DOCUMENTS

| | | |
|---|---|---|
| 2011/0240440 A1 | 10/2011 | Philipp |
| 2011/0241440 A1 | 10/2011 | Sakoda et al. |
| 2012/0049861 A1 | 3/2012 | Kim et al. |
| 2012/0161538 A1 | 6/2012 | Kinoshita et al. |
| 2013/0038136 A1* | 2/2013 | Wheatley ............ G06K 7/0008 307/104 |
| 2013/0234503 A1 | 9/2013 | Ichikawa |
| 2014/0308996 A1 | 10/2014 | Byun et al. |

FOREIGN PATENT DOCUMENTS

| | | |
|---|---|---|
| KR | 1020130067955 | 6/2013 |
| WO | WO 2010/085703 | 7/2010 |
| WO | WO 2012073349 | 6/2012 |

OTHER PUBLICATIONS

European Search Report dated Feb. 22, 2016 issued in counterpart application No. 13816003.1-1804, 10 pages.
Chinese Office Action dated Jun. 3, 2016 issued in counterpart application No. 201380042187.5, 10 pages.

* cited by examiner

WIRELESS POWER TRANSMITTER, WIRELESS POWER RECEIVER, AND METHOD FOR CONTROLLING SAME

PRIORITY

This application is a National Phase Entry of PCT International Application No. PCT/KR2013/006167, which was filed on Jul. 10, 2013, and claims a priority to Korean Patent Application No. 10-2012-0075098, which was filed on Jul. 10, 2012, the contents of each of which are incorporated herein by reference.

TECHNICAL FIELD

The present invention relates to a wireless power transmitter, a wireless power receiver, and control methods thereof and, more particularly, to a wireless power transmitter, a wireless power receiver, and control methods thereof which can wirelessly transmit/receive charging power.

BACKGROUND ART

Mobile terminals such as mobile phones, Personal Digital Assistants (PDAs) and the like are powered by rechargeable batteries. The battery of the mobile terminal is charged with electrical energy by a separate charging device. Typically, a separate contact terminal is formed on the outer side of each of the charging device and the battery, and the charging device and the battery are electrically connected to each other through contact between the two separate contact terminals.

However, in such a contact-type charging scheme, the contact terminals protrude outwardly, and thus are easily contaminated by foreign substances. As a result, battery charging is not correctly performed. Further, battery charging may not be correctly performed when the contact terminals are exposed to moisture.

In order to solve the above-mentioned problems, a wireless charging technology or a non-contact charging technology has recently been developed and used in many electronic devices.

The wireless charging technology uses wireless power transmission and reception, and corresponds to, for example, a system in which a battery is automatically charged if the battery is just put on a charging pad without connecting the mobile phone to a separate charging connector. Typically, the wireless charging technology is generally known to be used in a wireless electric toothbrush or a wireless electric shaver. The wireless charging technology can improve a waterproof function because it can be used to wirelessly charge the electronic devices. The wireless charging technology can improve the portability of the electronic devices because it does not require a wired charger. Therefore, it is expected that technologies related to the wireless charging technology will be significantly developed in the coming age of electric cars.

The wireless charging technology largely includes an electromagnetic induction scheme using a coil, a resonance scheme using resonance, and a Radio Frequency (RF)/microwave radiation scheme for converting electrical energy into a microwave and transmitting the microwave.

Until now, the wireless charging technology using the electromagnetic induction scheme has been the mainstream. However, recently, experiments in which power is wirelessly transmitted over a distance of several tens of meters by using microwaves have been successful at home and abroad. Accordingly, it is expected that an environment in which all electronic devices can be wirelessly charged anywhere and anytime will be realized in the near future.

A power transmission method using electromagnetic induction corresponds to a scheme for transmitting power between a primary coil and a secondary coil. When a magnet approaches the coil, an induced current is generated. A transmission side generates a magnetic field by using the induction current, and a reception side generates electrical energy by inducing a current according to a change in the magnetic field. This phenomenon is called a magnetic induction phenomenon, and the power transmission method using this phenomenon has excellent energy transmission efficiency.

With respect to the resonance scheme, in 2005, Professor Soljacic of the Massachusetts Institute of Technology (MIT) published a system in which electricity is wirelessly transferred from a charging device to a device to be charged by using a power transmission principle of the resonance scheme known as a coupled mode theory even when the device to be charged is several meters away from the charging device. A wireless charging system of the MIT research team employs the physics concept called "resonance" in which when a tuning fork oscillates at a particular frequency, a wine glass next to the tuning fork will oscillate at the same frequency. The MIT research team caused an electromagnetic wave containing electrical energy to resonate instead of causing sound to resonate. It is known that the resonant electrical energy does not affect surrounding machines and human bodies differently from other electromagnetic waves because the resonant electrical energy is directly transferred only to a device having a resonance frequency and its unused part is reabsorbed into an electromagnetic field instead of spreading into the air.

Meanwhile, a wireless power transmitter needs the development of a method for detecting a wireless power receiver. When the wireless power receiver is placed on the wireless power transmitter for the sake of wireless charging, the wireless power transmitter detects the placed wireless power receiver and can transmit charging power to the placed wireless power receiver. Specifically, when the wireless power receiver is not placed, the wireless power transmitter does not transmit charging power. Only when the wireless power receiver is placed, the wireless power transmitter can transmit charging power. Therefore, there is a need to develop a method in which a wireless power transmitter detects a wireless power receiver.

DETAILED DESCRIPTION OF THE INVENTION

Technical Problem

An aspect of various embodiments of the present invention is to provide a method in which a wireless power transmitter detects a wireless power receiver on the basis of an impedance change.

Technical Solution

In accordance with an aspect of the present invention, a control method of a wireless power transmitter for transmitting charging power to a wireless power receiver is provided. The control method may include adjusting an internal impedance of the wireless power transmitter such that an impedance change occurring when the wireless power receiver is placed is set to a second impedance change different from a first impedance change; applying detection power for detecting the wireless power receiver; detecting the second impedance change and detecting the wireless power receiver while applying the detection power; and changing the impedance change occurring when the wireless power receiver is placed from the second impedance change to the first impedance change.

In accordance with another aspect of the present invention, a wireless power transmitter for transmitting charging power to a wireless power receiver is provided. The wireless power transmitter may include an impedance change unit that sets an impedance change occurring when the wireless power receiver is placed to one of a first impedance change and a second impedance change; a power transmission unit that transmits the charging power to the wireless power receiver; and a control unit that performs a control operation for setting the impedance change occurring when the wireless power receiver is placed to a second impedance change, applying detection power for detecting the wireless power receiver to the power transmission unit, and changing the impedance change occurring when the wireless power receiver is placed from the second impedance change to the first impedance change, when detecting the second impedance change and detecting the wireless power receiver while applying the detection power.

In accordance with still another aspect of the present invention, a control method of a wireless power receiver for receiving charging power from a wireless power transmitter is provided. The control method may include setting an internal impedance of the wireless power receiver to a second impedance different from a first impedance; detecting an impedance change condition for changing the internal impedance of the wireless power receiver from the second impedance to the first impedance or receiving an impedance change command from the wireless power transmitter; and changing the internal impedance of the wireless power receiver from the second impedance to the first impedance when detecting the impedance change condition or receiving the impedance change command.

In accordance with yet another aspect of the present invention, a wireless power receiver for receiving charging power from a wireless power transmitter is provided. The wireless power receiver may include an impedance change unit that sets an internal impedance of the wireless power receiver to one of a first impedance and a second impedance different from the first impedance; and a control unit that changes the internal impedance of the wireless power receiver from the second impedance to the first impedance when detecting an impedance change condition for changing the internal impedance of the wireless power receiver from the second impedance to the first impedance.

In accordance with still yet another aspect of the present invention, a wireless power receiver for receiving charging power from a wireless power transmitter is provided. The wireless power receiver may include an impedance change unit that sets an internal impedance of the wireless power receiver to one of a first impedance and a second impedance different from the first impedance; a communication unit that receives, from the wireless power transmitter, an impedance change command which changes the internal impedance of the wireless power receiver from the second impedance to the first impedance; and a control unit that changes the internal impedance of the wireless power receiver from the second impedance to the first impedance when the impedance change command is received.

In accordance with further another aspect of the present invention, a wireless power transmitter for transmitting charging power to a wireless power receiver is provided. The wireless power transmitter may include a power transmission unit that transmits the charging power to the wireless power receiver; a control unit that applies detection power for detecting the wireless power receiver to the power transmission unit, and detects an impedance change and detects the wireless power receiver for a period during which the detection power is applied; and a communication unit that transmits an impedance change command which changes an internal impedance of the wireless power receiver from a second impedance to a first impedance different from the second impedance, when the wireless power receiver has been detected.

In accordance with still further another aspect of the present invention, a control method of a wireless power transmitter for transmitting charging power to a wireless power receiver is provided. The control method may include applying detection power for detecting the wireless power receiver; detecting an impedance change and detecting the wireless power receiver for a period during which the detection power is applied; and transmitting an impedance change command which changes an internal impedance of the wireless power receiver from a second impedance to a first impedance different from the second impedance, when the wireless power receiver has been detected.

Advantageous Effects

According to various embodiments of the present invention, methods are provided in which a wireless power transmitter detects a wireless power receiver on the basis of an impedance change. Particularly, a wireless power transmitter, according to an embodiment of the present invention, may be designed such that an impedance change in the case of placing a wireless power receiver is large during a period for detecting the wireless power receiver. Also, when transmitting charging power, the wireless power transmitter, according to an embodiment of the present invention, may increase the charging power transmission efficiency by readjusting an impedance. Further, a wireless power receiver, according to an embodiment of the present invention, may be designed such that an impedance change in the case of placing the wireless power receiver is large during a period for detecting the wireless power receiver. In addition, when receiving charging power, the wireless power receiver, according to an embodiment of the present invention, may increase the charging power transmission efficiency by readjusting an impedance.

MODE FOR CARRYING OUT THE INVENTION

Figure 1:
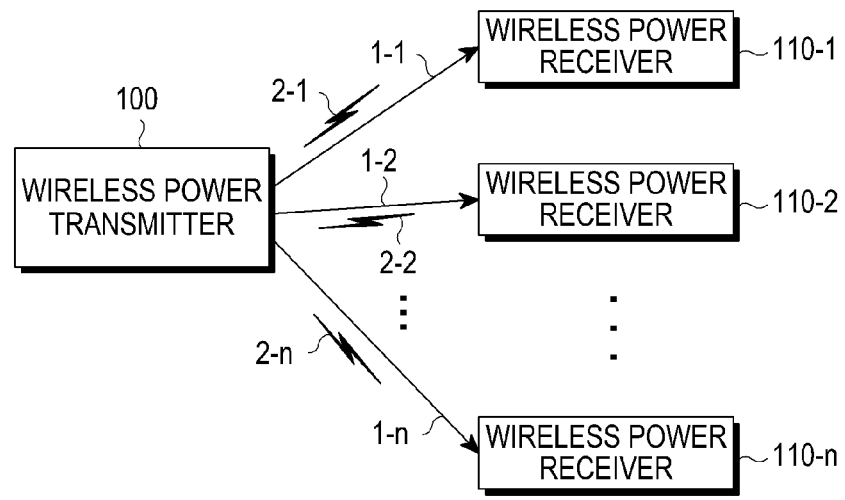
FIG. 1 is a conceptual view illustrating an overall operation of a wireless charging system.

Hereinafter, exemplary embodiments of the present invention will be described in more detail with reference to the accompanying drawings. It should be noted that the same components of the drawings are designated by the same reference numeral anywhere. In the following description of the present invention, a detailed description of known functions and configurations incorporated herein will be omitted when it may make the subject matter of the present invention rather unclear.

FIG. 1 is a conceptual view illustrating an overall operation of a wireless charging system. Referring to FIG. 1, the wireless charging system includes a wireless power transmitter 100 and one or more wireless power receivers 110-1, 110-2 and 110-n.

The wireless power transmitter 100 may wirelessly transmit power 1-1, power 1-2 and power 1-n to the one or more wireless power receivers 110-1, 110-2 and 110-n, respectively. More specifically, the wireless power transmitter 100 may wirelessly transmit power 1-1, power 1-2 and power 1-n to only the wireless power receivers authenticated after going through a predetermined authentication procedure.

The wireless power transmitter 100 may form an electrical connection to the wireless power receivers 110-1, 110-2 and 110-n. For example, the wireless power transmitter 100 may transmit wireless power having a form of an electromagnetic wave to each of the wireless power receivers 110-1, 110-2 and 110-n.

Meanwhile, the wireless power transmitter 100 may perform bidirectional communication with the wireless power receivers 110-1,110-2 and 110-n. Here, the wireless power transmitter 100 and the wireless power receivers 110-1, 110-2 and 110-n may process or transmit and receive packets 2-1, 2-2 and 2-n each including predetermined frames. Such a frame will be described in more detail below. The wireless power receiver may be implemented, particularly, by using a mobile communication terminal, a PDA, a Personal Media Player (PMP), a smart phone, or the like.

The wireless power transmitter 100 may wirelessly provide power to the one or more wireless power receivers 110-1, 110-2 and 110-n. For example, the wireless power transmitter 100 may transmit power to the one or more wireless power receivers 110-1, 110-2 and 110-n in the resonance scheme. When the wireless power transmitter 100 employs the resonance scheme, it is desirable that a distance between the wireless power transmitter 100 and the one or more wireless power receivers 110-1, 110-2 and 1110-n may be less than or equal to 30 m. Alternatively, when the wireless power transmitter 100 employs the electromagnetic induction scheme, it is desirable that a distance between the power providing apparatus 100 and the one or more wireless power receivers 110-1,110-2 and 110-n may be less than or equal to 10 cm.

Each of the wireless power receivers 110-1, 110-2 and 1110-n may receive wireless power from the wireless power transmitter 100 and may charge a battery included therein. Also, each of the wireless power receivers 110-1, 110-2 and 1110-n may transmit, to the wireless power transmitter 100, a signal for requesting the transmission of wireless power, information required to receive wireless power, state information of a wireless power receiver, or control information required by the wireless power transmitter 100. Information of the signal transmitted to the wireless power transmitter 100 will be described in more detail below.

Also, each of the wireless power receivers 110-1, 110-2 and 1110-n may transmit a message indicating a charging status thereof to the wireless power transmitter 100.

The wireless power transmitter 100 may include a display means such as a display unit, and may display a state of each of the wireless power receivers 110-1, 110-2 and 1110-n based on a message received from each of the wireless power receivers 110-1, 110-2 and 1110-n. Also, the wireless power transmitter 100 may display an expected time period until the charging of each of the wireless power receivers 110-1, 110-2 and 1110-n is completed, together with the state of each of the wireless power receivers 110-1, 110-2 and 1110-n.

The wireless power transmitter 100 may transmit a control signal for disabling a wireless charging function of each of the wireless power receivers 110-1, 110-2 and 1110-n. The wireless power receiver which has received the control signal for disabling the wireless charging function from the wireless power transmitter 100, may disable the wireless charging function thereof.

Figure 2:
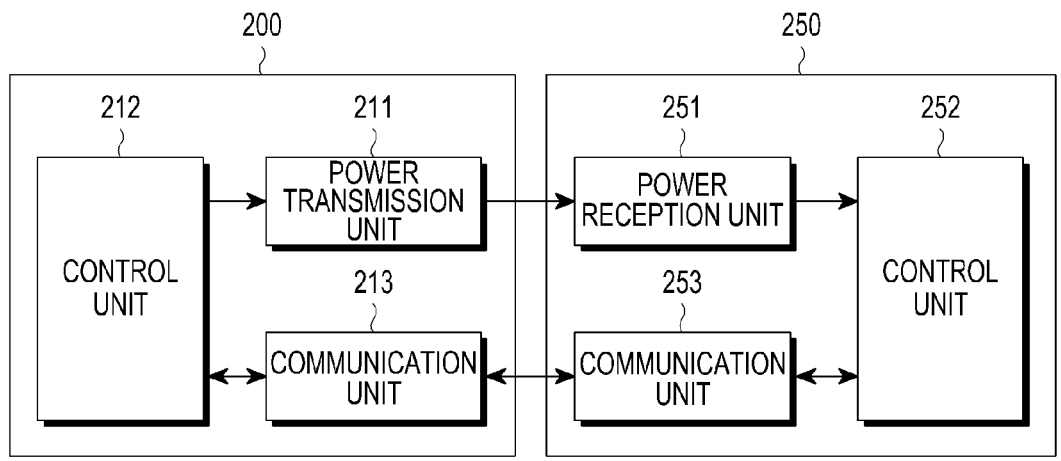
FIG. 2 is a block diagram illustrating a wireless power transmitter and a wireless power receiver according to an embodiment of the present invention.

FIG. 2 is a block diagram illustrating a wireless power transmitter and a wireless power receiver according to an embodiment of the present invention.

Referring to FIG. 2, the wireless power transmitter 200 may include a power transmission unit 211, a control unit 212, and a communication unit 213. Also, the wireless power receiver 250 may include a power reception unit 251, a control unit 252, and a communication unit 253.

The power transmission unit 211 may provide power that the wireless power transmitter 200 requires, and may wirelessly provide power to the wireless power receiver 250. Here, the power transmission unit 211 may supply power in the form of Alternating Current (AC). Alternatively, while supplying power in the form of Direct Current (DC), the power transmission unit 211 may convert the power in the form of DC into power in the form of AC by using an inverter, and thereby may supply the power in the form of AC. The power transmission unit 211 may be implemented in the form of a built-in battery. Alternatively, the power transmission unit 211 may be implemented in the form of an interface for receiving power, and may serve to receive power from the outside and supply the received power to elements other than itself. Those skilled in the art will easily understand that the power transmission unit 211 is not limited if it corresponds to any means capable of providing power having a predetermined AC waveform.

Also, the power transmission unit 211 may provide power having an AC waveform to the wireless power receiver 250 in the form of an electromagnetic wave. The power transmission unit 211 may additionally include a resonant circuit, and may transmit or receive a predetermined electromagnetic wave. When the power transmission unit 211 is implemented as a resonant circuit, an inductance L of a loop coil of the resonant circuit may be changed. Meanwhile, those skilled in the art will easily understand that the power transmission unit 211 is not limited if it corresponds to any means capable of transmitting and receiving electromagnetic waves.

The control unit 212 may control an overall operation of the wireless power transmitter 200. The control unit 212 may control the overall operation of the wireless power transmitter 200 by using an algorithm, a program or an application, which is read from a storage unit (not illustrated) and is required for control. The control unit 212 may be implemented in the form of a Central Processing Unit (CPU), a microprocessor, a minicomputer, or the like. A detailed operation of the control unit 212 will be described in more detail below.

The communication unit 213 may communicate with the wireless power receiver 250 by using a predetermined scheme. The communication unit 213 may communicate with the communication unit 253 of the wireless power receiver 250 by using Near Field Communication (NFC), Zigbee communication, infrared data association communication, visible light communication, Bluetooth communication, a Bluetooth Low Energy (BLE) scheme, or the like. The communication unit 213 may use a Carrier Sense Multiple Access/Collision Avoidance (CSMA/CA) algorithm. Meanwhile, the above-described communication schemes are for illustrative purposes only. Accordingly, the right scope of the present invention is not limited by a particular communication scheme that the communication unit 213 employs.

Meanwhile, the communication unit 213 may transmit a signal including information on the wireless power transmitter 200. Here, the communication unit 213 may unicast, multicast, or broadcast the signal. Table 1 below shows a data structure of a signal transmitted from the wireless power transmitter 200 according to an embodiment of the present invention. The wireless power transmitter 200 may transmit a signal having the following frame in every preset cycle, and hereinafter, the signal may be referred to as a "notice signal."

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

Frame type in Table 1 refers to a field indicating the type of signal, and indicates that a corresponding signal is a notice signal in Table 1. The protocol version field is a field indicating the type of protocol of a communication scheme and may be assigned, for example, 4 bits. The sequence number field is a field indicating a sequential order of the corresponding signal and may be assigned, for example, 1 byte. For example, the sequence number may increase by one in response to a step of transmitting and receiving signals. The network ID field is a field indicating a network ID of the wireless power transmitter 200 and may be assigned, for example, 1 byte. The Rx to Report (schedule mask) field is a field indicating wireless power receivers, which are to provide a report to the wireless power transmitter 200, and may be assigned, for example, 1 byte. Table 2 below shows the Rx to Report (schedule mask) field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

Here, Rx1 to Rx8 may correspond to wireless power receivers 1 to 8, respectively. The Rx to Report (schedule mask) field may be implemented such that a wireless power receiver having a number of a schedule mask expressed as 1 provides a report.

The reserved field is a field reserved for future use and may be assigned, for example, 5 bytes. The number of Rx field is a field indicating the number of wireless power receivers located around the wireless power transmitter 200 and may be assigned, for example, 3 bits.

The communication unit 213 may receive power information from the wireless power receiver 250. Here, the power information may include at least one of capacity, battery residual quantity, the number of times of charging, usage, battery capacity, and battery charge/consumption ratio of the wireless power receiver 250. Also, the communication unit 213 may transmit a charging function control signal for controlling a charging function of the wireless power receiver 250. The charging function control signal may be a control signal which controls the wireless power reception unit 251 of the particular wireless power receiver 250 to enable or disable the charging function of the particular wireless power receiver 250. Alternatively, the power information may include information on, for example, insertion of a wired charging terminal, transition from a SA mode to an NSA mode, release from an error situation, etc.

The communication unit 213 may receive signals from another wireless power transmitter (not illustrated) as well as from the wireless power receiver 250. For example, the communication unit 213 may receive a notice signal having a frame shown in Table 1 from another wireless power transmitter.

Meanwhile, as illustrated in FIG. 2, the power transmission unit 211 and the communication unit 213 are implemented as different hardware elements and the wireless power transmitter 200 performs communication in an out-band form. However, this configuration is described for illustrative purposes only. Alternatively, in the present invention, the power transmission unit 211 and the communication unit 213 may be implemented as one hardware element, and the wireless power transmitter 200 may perform communication in an in-band form.

The wireless power transmitter 200 and the wireless power receiver 250 may transmit and receive various signals. Accordingly, a process for subscribing the wireless power receiver 250 to a wireless power network hosted by the wireless power transmitter 200 and performing charging through the transmission and reception of wireless power may be performed. The above-described process will be described in more detail below.

Figure 3:
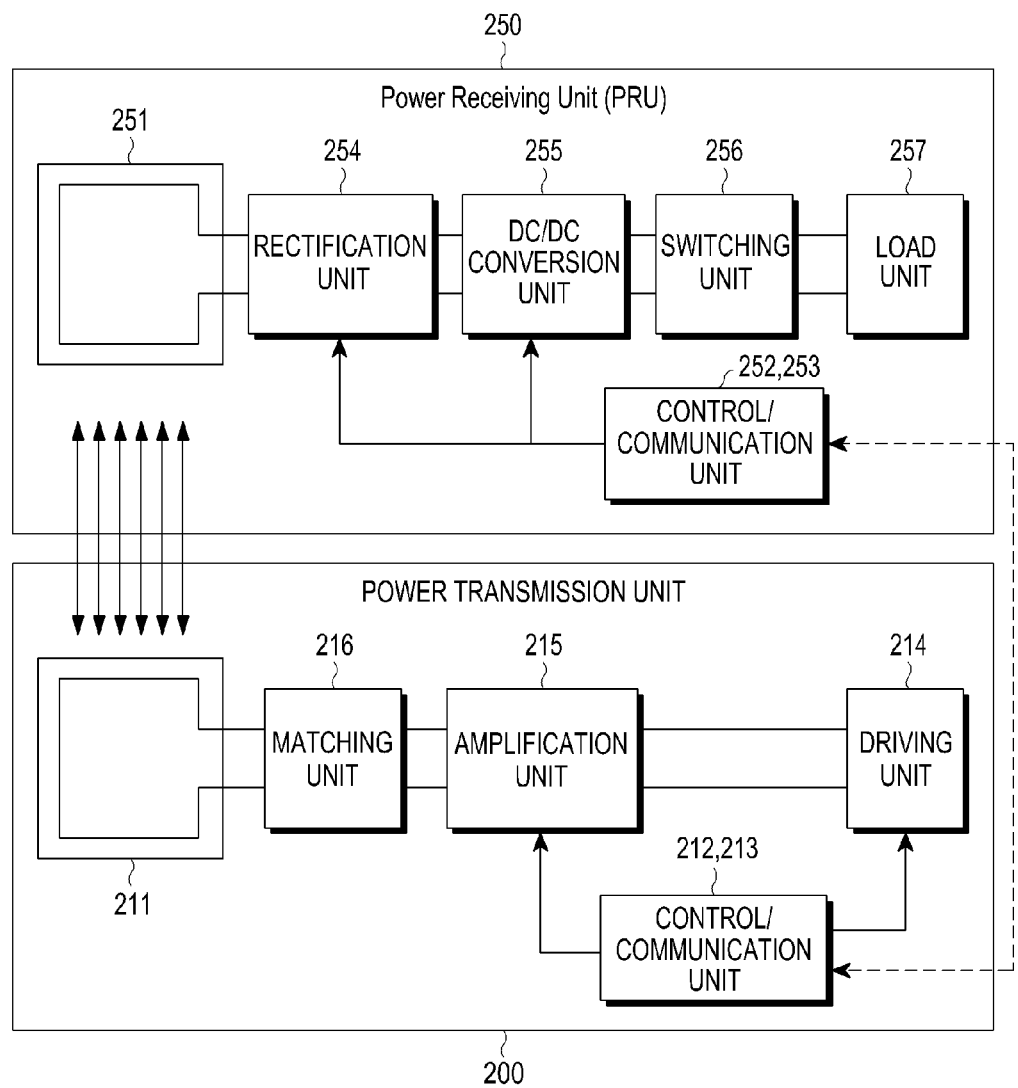
FIG. 3 is a detailed block diagram illustrating a wireless power transmitter and a wireless power receiver according to an embodiment of the present invention.

FIG. 3 is a detailed block diagram illustrating a wireless power transmitter and a wireless power receiver according to an embodiment of the present invention.

As illustrated in FIG. 3, the wireless power transmitter 200 may include the power transmission unit 211, the control/communication unit 212/213, a driving unit 214, an amplification unit 215, and a matching unit 216. The wireless power receiver 250 may include the power reception unit 251, the control/communication unit 252/253, a rectification unit 254, a DC/DC conversion unit 255, a switching unit 256, and a load unit 257.

The driving unit 214 may output DC power having a preset voltage value. The voltage value of the DC power output by the driving unit 214 may be controlled by the control/communication unit 212/213.

A DC current output from the driving unit 214 may be output to the amplification unit 215. The amplification unit 215 may amplify the DC current by a preset gain. Also, the amplification unit 215 may convert DC power to AC power on the basis of a signal input from the control/communication unit 212/213. Accordingly, the amplification unit 215 outputs AC power to the matching unit 216.

The matching unit 216 may perform impedance matching. For example, the matching unit 216 may adjust an impedance viewed from the matching unit 216 and may control output power to have high efficiency or high output. The matching unit 216 may adjust an impedance on the basis of the control of the control/communication unit 212/213. The matching unit 216 may include at least one of a coil and a capacitor. The control/communication unit 212/213 may control a connection state with at least one of the coil and the capacitor, and thereby may perform impedance matching.

The power transmission unit 211 may transmit input AC power to the power reception unit 251. The power transmission unit 211 and the power reception unit 251 may be implemented by resonant circuits both having an identical resonance frequency. For example, the resonance frequency may be determined as 6.78 MHz.

Meanwhile, the control/communication unit 212/213 may communicate with the control/communication unit 252/253 of the wireless power receiver 250.

Meanwhile, the power reception unit 251 may receive charging power.

The rectification unit 254 may rectify wireless power, which the power reception unit 251 receives, in the form of DC, and may be implemented in the form of, for example, a diode bridge. The DC/DC conversion unit 255 may convert the rectified power by a preset gain. For example, the DC/DC conversion unit 255 may convert the rectified power in such a manner that an output side has a voltage of 5 V. Meanwhile, minimum and maximum values of a voltage which may be applied to a front end of the DC/DC conversion unit 255 may be preset.

The switching unit 256 may connect the DC/DC conversion unit 255 to the load unit 257. The switching unit 256 may maintain an on/off state according to the control of the control unit 252. When the switching unit 256 is in the on state, the load unit 257 may store the converted power which is input from the DC/DC conversion unit 255.

Figure 4:
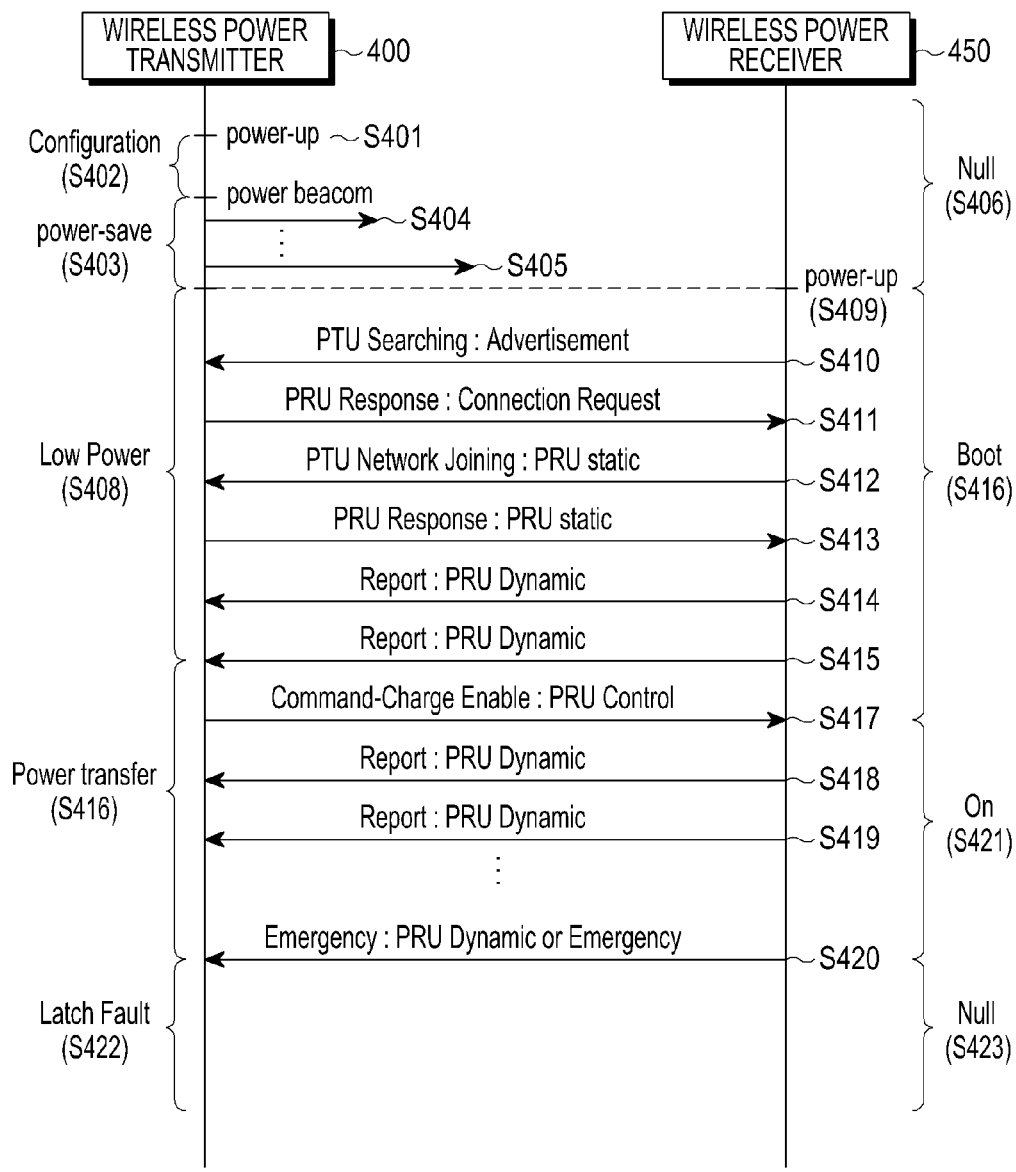
FIG. 4 is a signal flow diagram illustrating operations of a wireless power transmitter and a wireless power receiver according to an embodiment of the present invention.

FIG. 4 is a signal flow diagram illustrating operations of a wireless power transmitter and a wireless power receiver according to an embodiment of the present invention. As illustrated in FIG. 4, the wireless power transmitter 400 may apply power in step S401. When the power is applied, the wireless power transmitter 400 may configure an environment in step S402.

The wireless power transmitter 400 may enter a power save mode in step S403. In the power save mode, the wireless power transmitter 400 may apply different types of detection power beacons in respective cycles. For example, as illustrated in FIG. 4, the wireless power transmitter 400 may apply detection power beacons of steps S404 and S405, and sizes of power values of the detection power beacons of steps S404 and S405 may be different. Some or all of the detection power beacons of steps S404 and S405 may have the amount of power and an application time period which enable driving of the communication unit of the wireless power receiver 450. For example, the wireless power receiver 450 may drive the communication unit by using some or all of the detection power beacons of steps S404 and S405 and may communicate with the wireless power transmitter 400. The above-described state may be referred to as a "null state."

The wireless power transmitter 400 may detect a load change due to the placement of the wireless power receiver 450. The wireless power transmitter 400 may enter a low power mode in step S409. The low power mode may be a mode in which the wireless power transmitter 400 applies detection power periodically or aperiodically. Meanwhile, the wireless power receiver 450 may drive the communication unit on the basis of power received from the wireless power transmitter 400 in step S409.

The wireless power receiver 450 may transmit a wireless power transmitter (i.e., Power Transmitting Unit (PTU)) searching signal to the wireless power transmitter 400 in step S410. The wireless power receiver 450 may transmit the PTU searching signal as a BLE-based advertisement signal. The wireless power receiver 450 may transmit a PTU searching signal periodically or aperiodically, and may transmit the PTU searching signal until the wireless power receiver 450 receives a response signal from the wireless power transmitter 400 or until a preset time period arrives.

When receiving the PTU searching signal from the wireless power receiver 450, the wireless power transmitter 400 may transmit a wireless power receiver (i.e., Power Receiving Unit (PRU)) response signal in step S411. Here, the PRU response signal may establish a connection between the wireless power transmitter 400 and the wireless power receiver 450.

The wireless power receiver 450 may transmit a PRU static signal in step S412. Here, the PRU static signal may be a signal indicating a state of the wireless power receiver 450, and may be used to request subscription to the wireless power network managed by the wireless power transmitter 400.

The wireless power transmitter 400 may transmit a PTU static signal in step S413. The PTU static signal transmitted by the wireless power transmitter 400 may be a signal indicating a capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal in steps S414 and S415. The PRU dynamic signal may include at least one piece of parameter information measured by the wireless power receiver 450. For example, the PRU dynamic signal may include voltage information at the rear end of the rectification unit of the wireless power receiver 450. The state of the wireless power receiver 450 may be referred to as a "boot state."

The wireless power transmitter 400 may enter a power transmission mode in step S416, and may transmit a PRU command signal, which is a command signal for allowing the wireless power receiver 450 to perform charging, in step S417. In the power transmission mode, the wireless power transmitter 400 may transmit charging power.

The PRU command signal transmitted by the wireless power transmitter 400 may include information, which enables/disables charging of the wireless power receiver 450, and permission information. The PRU command signal may be transmitted when the wireless power transmitter 400 changes the state of the wireless power receiver 450, or may be transmitted in a preset cycle (e.g., 250 ms). The wireless power receiver 450 may change a configuration according to the PRU command signal and may transmit the PRU dynamic signal for reporting the state of the wireless power receiver 450, in steps S418 and S419. The PRU dynamic signal transmitted by the wireless power receiver 450 may include at least one piece of information on a voltage, a current, a state of the wireless power receiver and a temperature thereof. The state of the wireless power receiver 450 may be referred to as an "on state."

Meanwhile, the PRU dynamic signal may have a data structure as shown in Table 3 below.

TABLE 3

| Field | octets | description | use | units |
|---|---|---|---|---|
| optional fields | 1 | defines which optional fields are populated | mandatory | |
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg. C. from −40 C. |
| Vrect min dyn | 2 | Vrect low limit(dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU | 3 | undefined | | |

As shown in Table 3, the PRU dynamic signal may include at least one of optional field information, voltage information at the rear end of the rectification unit of the wireless power receiver, current information at the rear end of the rectification unit of the wireless power receiver, voltage information at the rear end of the DC/DC conversion unit of the wireless power receiver, current information at the rear end of the DC/DC conversion unit of the wireless power receiver, temperature information, minimum voltage value information at the rear end of the rectification unit of the wireless power receiver, optimal voltage value information at the rear end of the rectification unit of the wireless power receiver, maximum voltage value information at the rear end of the rectification unit of the wireless power receiver, and alert information.

The alert information may be formed to have a data structure as shown in Table 4 below.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

As shown in Table 4, the alert information may include over voltage, over current, over temperature, charge complete, TA detect (i.e., detect insertion of wired charging terminal), transition (i.e., transition to SA/NSA mode), restart request, and the like.

The wireless power receiver 450 may receive a PRU command signal and may perform charging. For example, when the wireless power transmitter 400 has enough power to charge the wireless power receiver 450, the wireless power transmitter 400 may transmit the PRU command signal for enabling the charging. Meanwhile, the PRU command signal may be transmitted whenever a charging state is changed. The PRU command signal may be transmitted at intervals of, for example, 250 ms, or may be transmitted when a parameter is changed. The PRU command signal may be set to be transmitted within a preset threshold time period (e.g., one second) although the parameter is not changed.

Meanwhile, the wireless power receiver 450 may detect the occurrence of an error. The wireless power receiver 450 may transmit an alert signal to the wireless power transmitter 400 in step S420. The alert signal may be transmitted as the PRU dynamic signal or a PRU alert signal. For example, the wireless power receiver 450 may reflect the error situation in the PRU alert field of Table 3 and may transmit the PRU alert field, in which the error situation is reflected, to the wireless power transmitter 400. Alternatively, the wireless power receiver 450 may transmit a single alert signal, which indicates the error situation, to the wireless power transmitter 400. When receiving the alert signal, the wireless power transmitter 400 may enter a latch fault mode in step S422. The wireless power receiver 450 may enter a null state in step S423.

Figure 5:
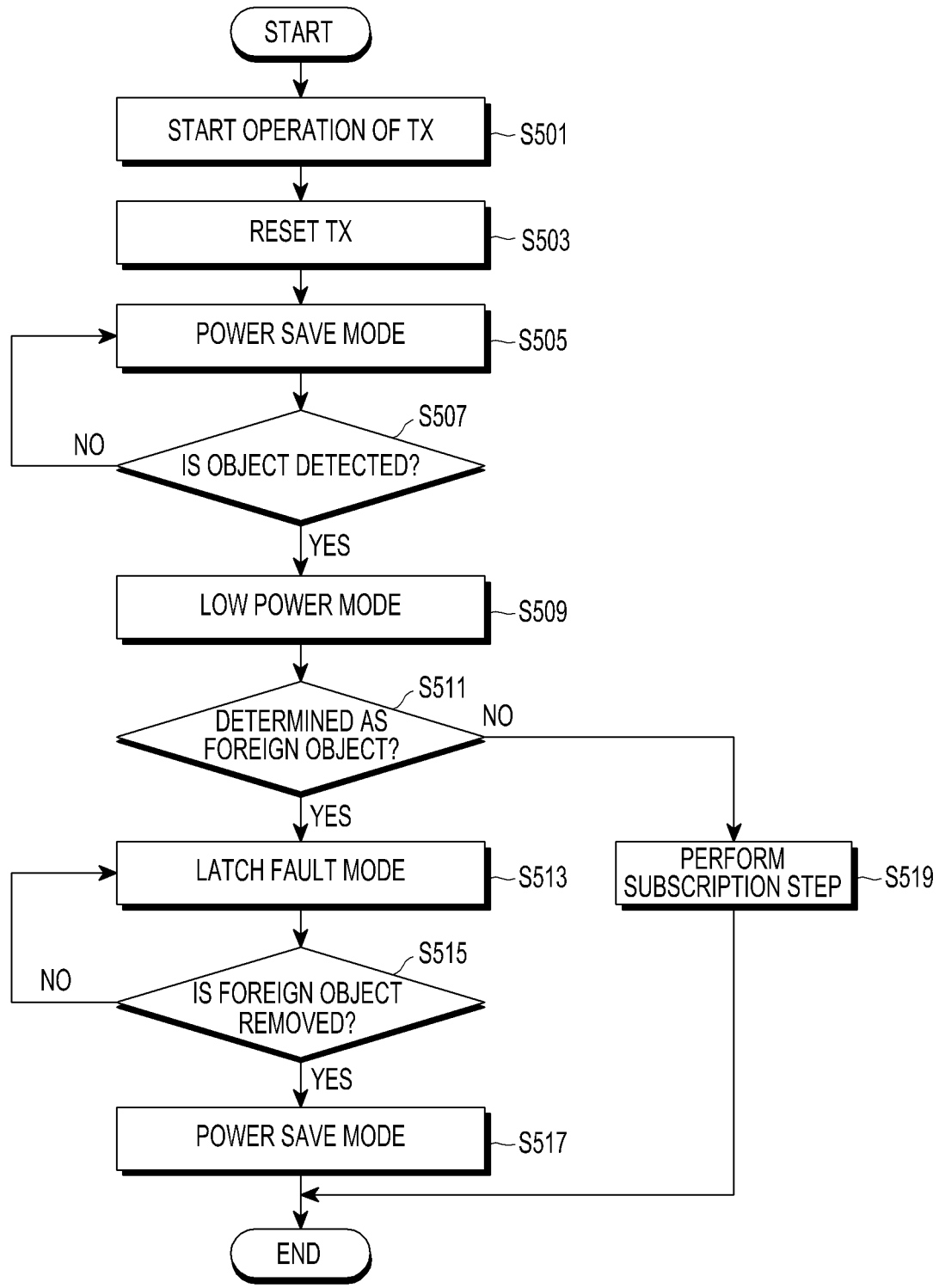
FIG. 5 is a flowchart illustrating operations of a wireless power transmitter and a wireless power receiver according to another embodiment of the present invention.
Figure 6:
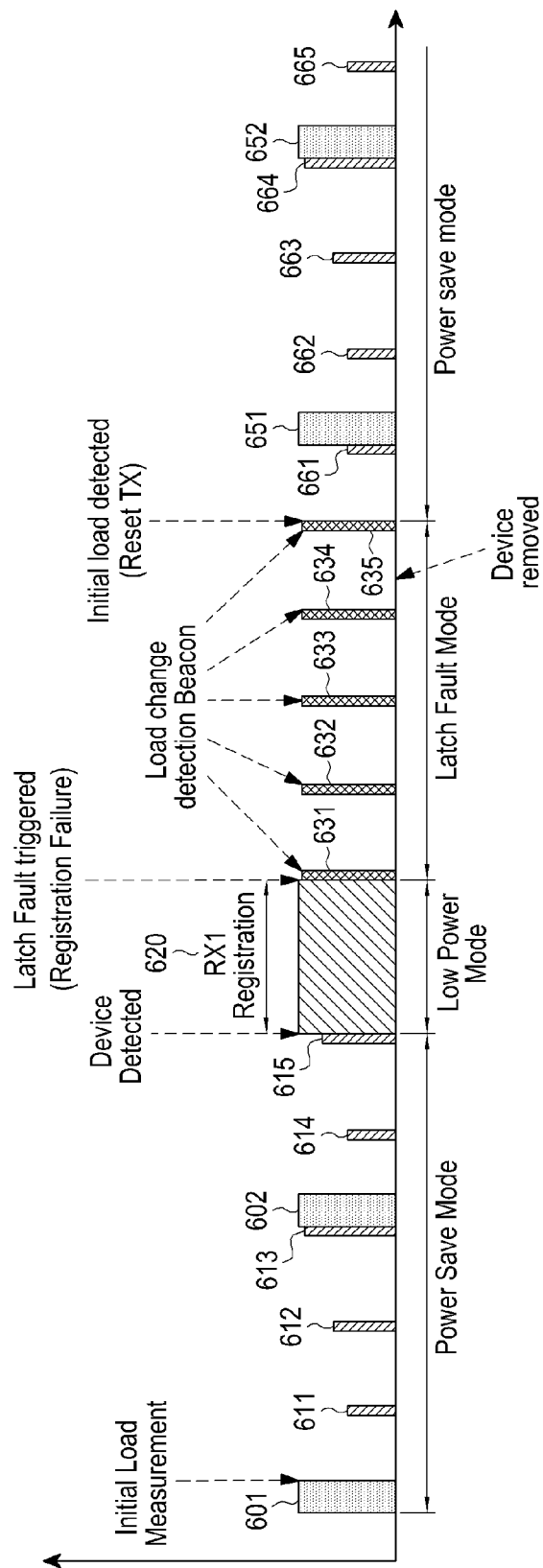
FIG. 6 is a graph of the amount of power applied by a wireless power transmitter according to an embodiment of FIG. 5 against a time axis.

FIG. 5 is a flowchart illustrating operations of a wireless power transmitter and a wireless power receiver according to another embodiment of the present invention. The control method illustrated in FIG. 5 will be described in more detail with reference to FIG. 6. FIG. 6 is a graph of the amount of power applied by a wireless power transmitter according to an embodiment of FIG. 5 against a time axis.

As illustrated in FIG. 5, the wireless power transmitter may start the operation thereof in step S501. Also, the wireless power transmitter may reset an initial configuration thereof in step S503. The wireless power transmitter may enter a power save mode in step S505. Here, the power save mode may correspond to a period, during which the wireless power transmitter may apply different types of power having different power amounts to the power transmission unit. For example, the power save mode may correspond to a period, during which the wireless power transmitter may apply second detection power 601 and 602 and third detection power 611, 612, 613, 614 and 615 illustrated in FIG. 6 to the power transmission unit. Here, the wireless power transmitter may periodically apply the second detection power 601 and 602 in a second cycle. When applying the second detection power 601 and 602, the wireless power transmitter may apply the second detection power 601 and 602 during a second period. The wireless power transmitter may periodically apply the third detection power 611, 612, 613, 614 and 615 in a third cycle. When applying the third detection power 611, 612, 613, 614 and 615, the wireless power transmitter may apply the third detection power 611, 612, 613, 614 and 615 during a third period. Meanwhile, although it is illustrated that power values of the third detection power 611, 612, 613, 614 and 615 are different, the power values of the third detection power 611, 612, 613, 614 and 615 may be different or the same.

After outputting the third detection power 611, the wireless power transmitter may output the third detection power 612 having a power amount identical to that of the third detection power 611. When the wireless power transmitter outputs the third detection power 611 and 612 both having the identical power amount as described above, the third detection power may have a power amount which enables the detection of a smallest wireless power receiver, for example, a wireless power receiver of category 1.

After outputting the third detection power 611, the wireless power transmitter may output the third detection power 612 having a power amount different from that of the third detection power 611. When the wireless power transmitter outputs the third detection power 612 having a power amount different from that of the third detection power 611 as described above, the third detection power may have respective power amounts which enable the detection of wireless power receivers of categories 1 to 5. For example, the third detection power 611 may have a power amount which enables the detection of a wireless power receiver of category 5. The third detection power 612 may have a power amount which enables the detection of a wireless power receiver of category 3. The third detection power 613 may have a power amount which enables the detection of a wireless power receiver of category 1.

Meanwhile, the second detection power 601 and 602 may be power which can drive the wireless power receiver. More specifically, the second detection power 601 and 602 may have a power amount value which can drive the control/communication unit of the wireless power receiver.

The wireless power transmitter may apply the second detection power 601 and 602 and the third detection power 611, 612, 613, 614 and 615 to the power reception unit in second and third cycles, respectively. When the wireless power receiver is placed on the wireless power transmitter, an impedance viewed from a point of the wireless power transmitter may be changed. While applying the second detection power 601 and 602 and the third detection power 611, 612, 613, 614 and 615, the wireless power transmitter may detect an impedance change. For example, while applying the third detection power 615, the wireless power transmitter may detect an impedance change. Accordingly, the wireless power transmitter may detect an object in step S507. When the object is not detected (No in step S507), the wireless power transmitter may maintain the power save mode, in which different types of power are periodically applied, in step S505.

In contrast, when the impedance is changed and thus the object is detected (Yes in step S507), the wireless power transmitter may enter a low power mode. Here, the low power mode is a mode in which the wireless power transmitter may apply driving power having a power amount which can drive the control/communication unit of the wireless power receiver. For example, in FIG. 6, the wireless power transmitter may apply driving power 620 to the power transmission unit. The wireless power receiver may receive the driving power 620 and may drive the control/communication unit with the received driving power 620. The wireless power receiver may communicate with the wireless power transmitter according to a predetermined scheme on the basis of the driving power 620. For example, the wireless power receiver may transmit/receive data required for authentication, and may subscribe to the wireless power network, that the wireless power transmitter manages, on the basis of the transmission/reception of the data. However, when a foreign object other than the wireless power receiver is placed on the wireless power transmitter, the data transmission/reception may not be performed. Accordingly, the wireless power transmitter may determine whether the placed object is a foreign object, in step S511. For example, when the wireless power transmitter does not receive a response from the object during a preset time period, the wireless power transmitter may determine that the object is a foreign object.

When the object is determined as the foreign object (Yes in step S511), the wireless power transmitter may enter the latch fault mode. For example, the wireless power transmitter may periodically apply first power 631 to 634 illustrated in FIG. 6 in a first cycle. While applying the first power, the wireless power transmitter may detect an impedance change. For example, when the foreign object is removed, the wireless power transmitter may detect an impedance change, and may determine that the foreign object is removed. In contrast, when the foreign object is not removed, the wireless power transmitter may not detect an impedance change, and may determine that the foreign object is not removed. When the foreign object is not removed, the wireless power transmitter may output at least one of lamp light and an alert sound and thereby may notify the user that the wireless power transmitter is currently in an error state. Accordingly, the wireless power transmitter may include an output unit that outputs at least one of the lamp light and the alert sound.

When it is determined that the foreign object is not removed (No in step S515), the wireless power transmitter may maintain the latch fault mode in step S513. In contrast, when it is determined that the foreign object is removed (Yes in step S515), the wireless power transmitter may reenter the power save mode in step S517. For example, the wireless power transmitter may apply second power 651 and 652, and third power 661 to 665.

Meanwhile, in the case illustrated in FIGS. 5 and 6, when an impedance change due to the placement of the wireless power receiver is not large, it may be difficult to detect the wireless power receiver.

Figure 7:
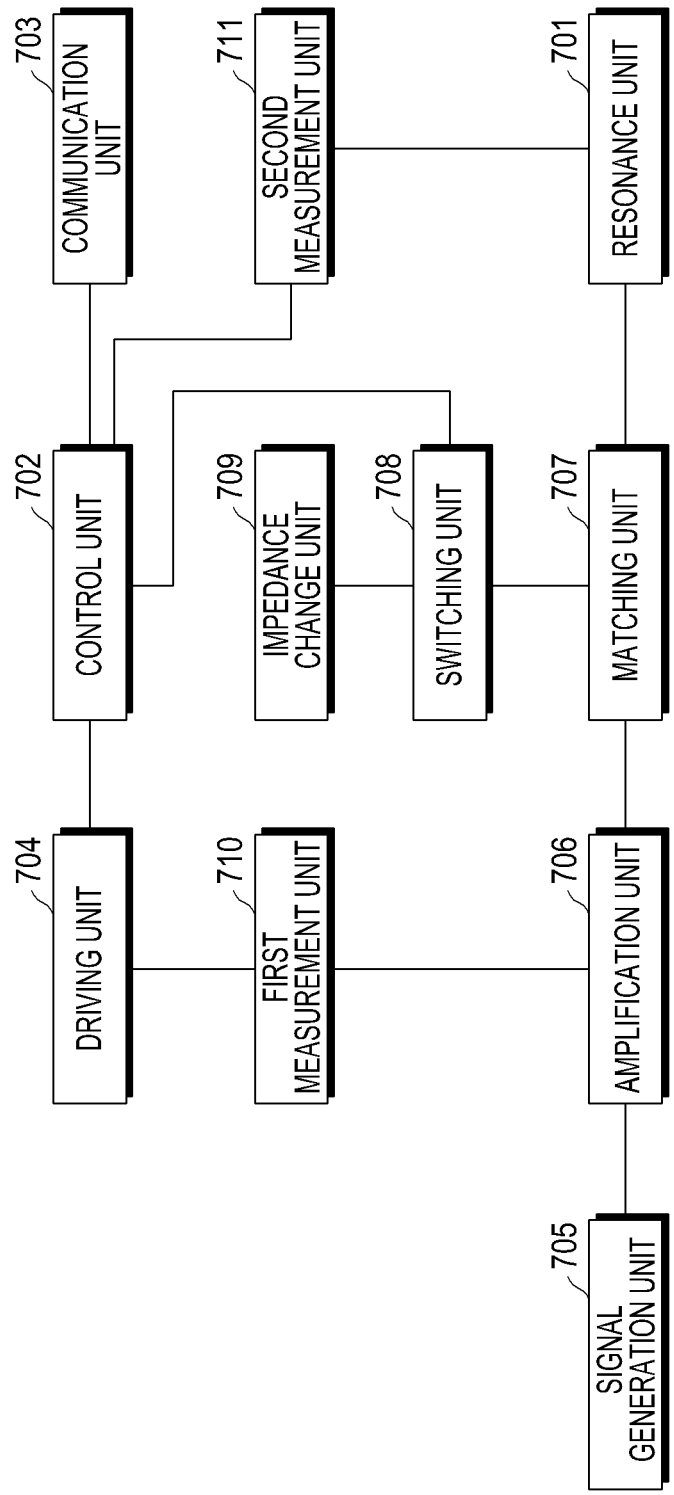
FIG. 7 is a block diagram illustrating a wireless power transmitter according to an embodiment of the present invention.

FIG. 7 is a block diagram illustrating a wireless power transmitter according to an embodiment of the present invention.

The wireless power transmitter may include a resonance unit 701, a control unit 702, a communication unit 703, a driving unit 704, a signal generation unit 705, an amplification unit 706, a matching unit 707, a switching unit 708, an impedance change unit 709, a first measurement unit 710, and a second measurement unit 711.

The resonance unit 701 may wirelessly provide charging power to the wireless power receiver. Here, the resonance unit 701 may supply power in the form of AC. Alternatively, while supplying power in the form of DC, the resonance unit 701 may convert the power in the form of DC into power in the form of AC by using an inverter, and thereby may supply the power in the form of AC. The resonance unit 701 may be designed to transmit charging power at a preset resonant frequency, and may include at least one resonant circuit.

The control unit 702 may control an overall operation of the wireless power transmitter. Particularly, the control unit 702 may control an on/off state of the switching unit 708, and thereby may control a connection state of the switching unit 708 to the impedance change unit 709. While detecting the wireless power receiver, the control unit 702 may control the switching unit 708 to be in the on state. The control unit 702 may control the switching unit 708 to be in the on state and thereby may control the impedance change unit 709 to be connected to the matching unit 707. Meanwhile, after detecting the wireless power receiver, the control unit 702 may control the switching unit 708 to be in the off state. The control unit 702 may control the switching unit 708 to be in the off state and thereby may control the impedance change unit 709 not to be connected to the matching unit 707.

The communication unit 703 may communicate with the wireless power receiver in an out-band scheme. The communication unit 703 may perform communication by using NFC, Zigbee communication, infrared data association communication, visible light communication, Bluetooth communication, a BLE scheme, or the like. The communication unit 703 may be implemented by a communication module corresponding to a communication scheme.

The driving unit 704 may output DC power having a preset voltage value. Power which is output by the driving unit 704 may be amplified with a preset gain by the amplification unit 706. The amplification unit 706 may be implemented as a class D amplifier or a class E amplifier. The amplification unit 706 may amplify DC power according to a signal, which is output by the signal generation unit 705, and may output charging power having an AC waveform. The charging power, which is output by the amplification unit 706, may be transmitted to the wireless power receiver through the resonance unit 701.

The matching unit 707 may include at least one of at least one passive element and at least one active element, and may perform impedance matching between the matching unit 707 and the wireless power receiver. The matching unit 707 can maximize charging power transmission efficiency by performing the impedance matching. The matching unit 707 may be designed to include at least one of at least one passive element and at least one active element which allow an impedance to maximize the charging power transmission efficiency.

The matching unit 707 may be connected to the switching unit 708, and the switching unit 708 may be connected to the impedance change unit 709. Accordingly, depending on the on/off state of the switching unit 708, the impedance change unit 709 may be connected or may not be connected to the matching unit 707.

The first measurement unit 710 may measure at least one of a power value, a current value, a voltage value and an impedance which are applied to the driving unit 704 or the amplification unit 706. The second measurement unit 711 may measure at least one of a power value, a current value, a voltage value and an impedance which are applied to the resonance unit 701. The control unit 702 may detect an impedance change on the basis of power information which is input from at least one of the first measurement unit 710 and the second measurement unit 711. Meanwhile, in FIG. 7, the wireless power transmitter is illustrated as including the first measurement unit 710 and the second measurement unit 711. However, the wireless power transmitter may include only one of the first measurement unit 710 and the second measurement unit 711.

The impedance change unit 709 may include at least one of at least one passive element and at least one active element. When the switching unit 708 is controlled to be in the on state, the impedance change unit 709 may be connected to the matching unit 707. Accordingly, an impedance of the wireless power transmitter may be changed. Particularly, the impedance change unit 709 may be designed to allow easy detection of the wireless power receiver. More specifically, the impedance change unit 709 may be designed such that an impedance change in a case where the wireless power receiver is placed on the wireless power transmitter is larger than that in a case where the wireless power receiver is not placed on the wireless power transmitter.

When an impedance change due to the placement of the wireless power receiver in a case where the impedance change unit 709 is not connected is a first impedance change and an impedance change due to the placement of the wireless power receiver in a case where the impedance change unit 709 is connected is a second impedance change, the second impedance change may be larger than the first impedance change.

The impedance change unit 709 may be designed such that the impedance change due to the placement of the wireless power receiver in the case where the impedance change unit 709 is connected is larger than the impedance change due to the placement of the wireless power receiver in the case where the impedance change unit 709 is not connected. In this regard, when the impedance change unit 709 is connected, an impedance change due to the placement of the wireless power receiver is relatively large and thus it may be easy to detect the wireless power receiver, but the charging power transmission efficiency may be degraded.

After detecting the wireless power receiver, the control unit 702 may control the switching unit 708 to be in the off state, and may control the impedance change unit 709 not to be connected. Accordingly, after detecting the wireless power receiver, the control unit 702 may again increase the charging power transmission efficiency.

Figure 8:
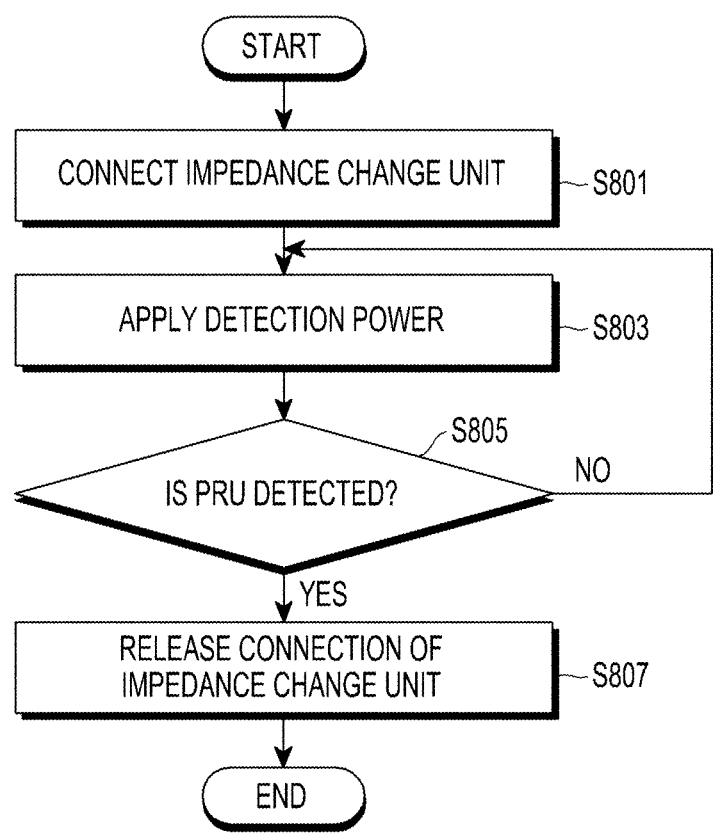
FIG. 8 is a flowchart illustrating a control method of a wireless power transmitter according to an embodiment of the present invention.

FIG. 8 is a flowchart illustrating a control method of a wireless power transmitter according to an embodiment of the present invention. The wireless power transmitter may connect the impedance change unit to the matching unit 707 in step S801. As described above with reference to FIG. 7, the impedance change unit may operate in such a manner that an impedance change in the case of placing the wireless power receiver is large. More specifically, the wireless power transmitter may adjust an internal impedance so as to change the impedance change in the case of placing the wireless power receiver from the first impedance change to the second impedance change. Here, the second impedance change may be larger than the first impedance change.

Accordingly, the wireless power transmitter can clearly detect the impedance change due to the placement of the wireless power receiver. As described above, a mode in which the wireless power transmitter connects the impedance change unit to the matching unit 707 and detects the wireless power receiver may be referred to as a "wireless power receiver detection mode." Meanwhile, a case is considered in which the wireless power transmitter has first wireless power transmission efficiency in the wireless power receiver detection mode.

Meanwhile, the wireless power transmitter may apply detection power for detecting the wireless power receiver in step S803. The wireless power transmitter may detect the wireless power receiver during a period for applying the detection power in step S805. While applying the detection power, the wireless power transmitter may measure a first impedance. When the wireless power receiver is detected, the wireless power transmitter may measure a second impedance while applying the detection power. When a difference between the first impedance and the second impedance is greater than a preset threshold, the wireless power transmitter may determine that the wireless power receiver is placed.

When the wireless power receiver has been detected (Yes in step S805), the wireless power transmitter may release the connection of the impedance change unit in step S807. Here, a mode in which the wireless power transmitter releases the connection of the impedance change unit may be referred to as a "wireless power transmission mode." In the wireless power transmission mode, the wireless power transmitter has second wireless power transmission efficiency, and the second wireless power transmission efficiency may higher than the first wireless power transmission efficiency. Accordingly, the wireless power transmitter may transmit wireless power at the second wireless power transmission efficiency which is higher than the first wireless power transmission efficiency.

Figure 9:
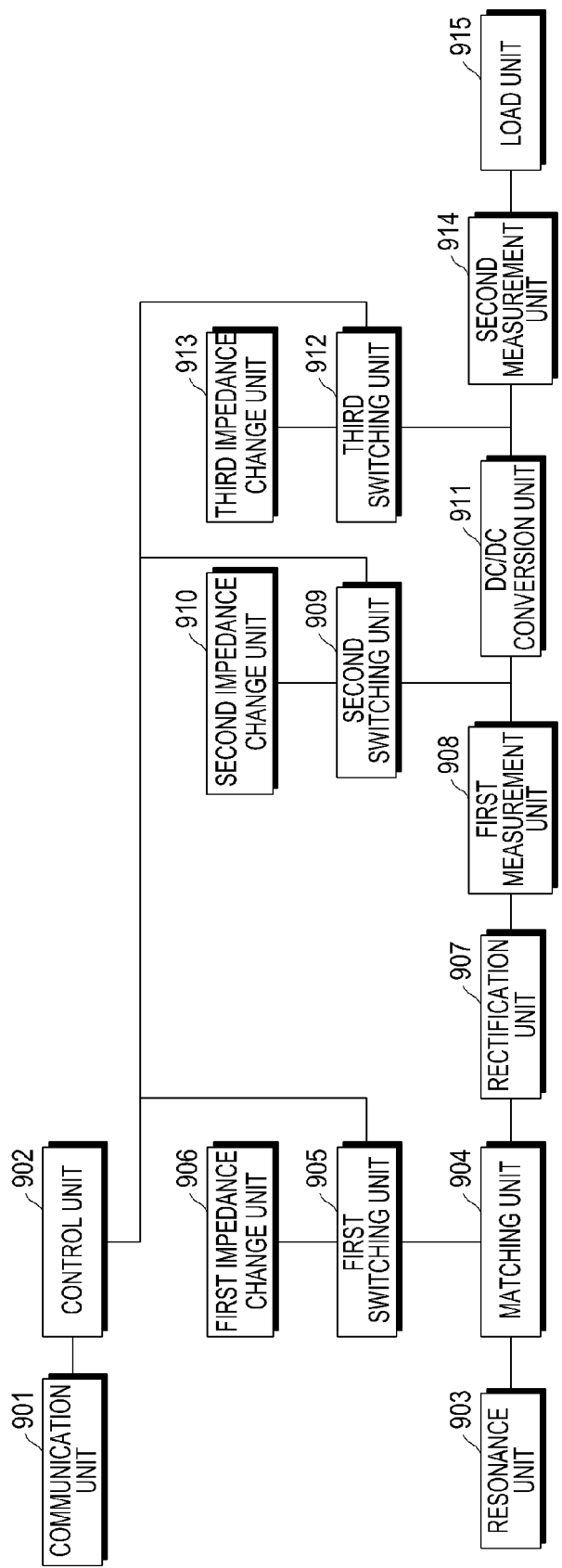
FIG. 9 is a block diagram illustrating a wireless power receiver according to an embodiment of the present invention.

FIG. 9 is a block diagram illustrating a wireless power receiver according to an embodiment of the present invention. The wireless power receiver may include a communication unit 901, a control unit 902, a resonance unit 903, a matching unit 904, a first switching unit 905, a first impedance change unit 906, a rectification unit 907, a first measurement unit 908, a second switching unit 909, a second impedance change unit 910, a DC/DC conversion unit 911, a third switching unit 912, a third impedance change unit 913, a second measurement unit 914, and a load unit 915.

The communication unit 901 may communicate with the wireless power transmitter in an out-band scheme. The communication unit 901 may perform communication by using NFC, Zigbee communication, infrared data association communication, visible light communication, Bluetooth communication, a BLE scheme, or the like. The communication unit 901 may be implemented by a communication module corresponding to a communication scheme.

The control unit 902 may control an overall operation of the wireless power receiver. The control unit 902 may control an on/off state of at least one of the first switching unit 905, the second switching unit 909 and the third switching unit 912. Accordingly, the control unit 902 may control a connection state of each of the first impedance change unit 906, the second impedance change unit 910 and the third impedance change unit 913 to the wireless power receiver.

When detecting an impedance change condition, the control unit 902 may release the connection of each of the first impedance change unit 906, the second impedance change unit 910 and the third impedance change unit 913. Alternatively, when the communication unit 901 receives an impedance change command, the control unit 902 may release the connection of each of the first impedance change unit 906, the second impedance change unit 910 and the third impedance change unit 913.

The resonance unit 903 may receive charging power provided by the wireless power transmitter. The resonance unit 903 may be designed to receive charging power at a preset resonant frequency, and may include at least one resonant circuit.

The matching unit 904 may include at least one of at least one passive element and at least one active element, and may perform impedance matching between the matching unit 904 and the wireless power transmitter. The matching unit 904 can maximize charging power transmission efficiency by performing the impedance matching. The matching unit 904 may be designed to include at least one of at least one passive element and at least one active element which allow an impedance to maximize the charging power transmission efficiency.

The rectification unit 907 may rectify charging power in the form of DC. The first measurement unit 908 may measure at least one of a current value, a voltage value, a power value and an impedance value at the rear end of the rectification unit 907, namely, the front end of the DC/DC conversion unit 911. The DC/DC conversion unit 911 may convert the rectified power by a preset gain. For example, the DC/DC conversion unit 911 may convert the rectified power in such a manner that the output side thereof has a voltage of 5 V.

The second measurement unit 914 may measure at least one of a current value, a voltage value, a power value and an impedance value at the rear end of the DC/DC conversion unit 911. The load unit 915 may store the converted power which is input from the DC/DC conversion unit 911.

The first impedance change unit 906 may be disposed in front of the rectification unit 907. The second impedance change unit 910 may be disposed in front of the DC/DC conversion unit 911. The third impedance change unit 913 may be disposed at the rear of the DC/DC conversion unit 911.

Each of the first impedance change unit 906, the second impedance change unit 910 and the third impedance change unit 913 may include at least one of at least one passive element and at least one active element. When the first impedance change unit 906, the second impedance change unit 910 and the third impedance change unit 913 are connected, an impedance of the wireless power transmitter may be changed. Particularly, the first impedance change unit 906, the second impedance change unit 910 and the third impedance change unit 913 may be designed to allow easy detection of the wireless power receiver. More specifically, the first impedance change unit 906, the second impedance change unit 910 and the third impedance change unit 913 may be designed such that an impedance change in a case where the wireless power receiver is placed on the wireless power transmitter is larger than that in a case where the wireless power receiver is not placed on the wireless power transmitter. That is, the first impedance change unit 906, the second impedance change unit 910 and the third impedance change unit 913 may be designed such that an impedance change due to the placement of the wireless power receiver in a case where the first impedance change unit 906, the second impedance change unit 910 and the third impedance change unit 913 are connected is larger than an impedance change due to the placement of the wireless power receiver in a case where the first impedance change unit 906, the second impedance change unit 910 and the third impedance change unit 913 are not connected. In this regard, when the first impedance change unit 906, the second impedance change unit 910 and the third impedance change unit 913 are connected, an impedance change due to the placement of the wireless power receiver is relatively large and thus it may be easy to detect the wireless power receiver, but the charging power transmission efficiency may be degraded.

Meanwhile, although the wireless power receiver is illustrated as including all of the first impedance change unit 906, the second impedance change unit 910 and the third impedance change unit 913 in an embodiment illustrated in FIG. 9, this configuration is for illustrative purposes only. Alternatively, the wireless power receiver may include at least one of the first impedance change unit 906, the second impedance change unit 910 and the third impedance change unit 913.

Figure 10A:
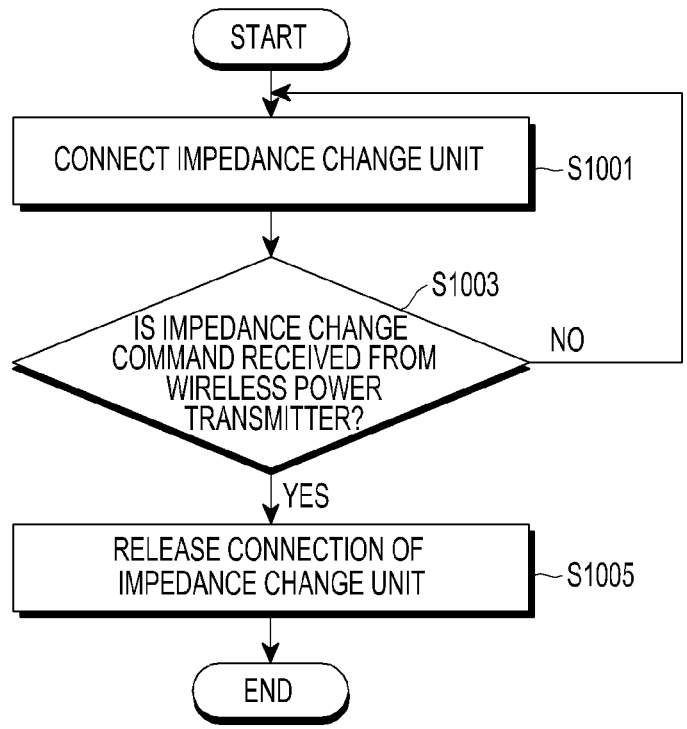
FIGS. 10A and 10B are flowcharts illustrating control methods of wireless power receivers according to various embodiments of the present invention.
Figure 10B:
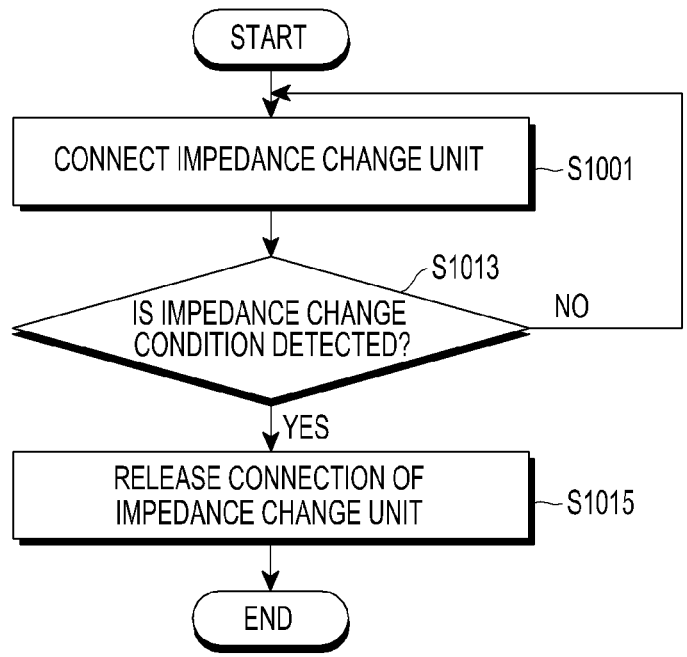

FIGS. 10A and 10B are flowcharts illustrating control methods of wireless power receivers according to various embodiments of the present invention.

The wireless power receiver may connect the impedance change unit in step S1001. The wireless power receiver may connect at least one of the first impedance change unit 906, the second impedance change unit 910 and the third impedance change unit 913, which are illustrated in FIG. 9, to the wireless power receiver.

Specifically, the wireless power receiver may change an internal impedance from a first impedance to a second impedance. When the wireless power receiver having the second impedance is placed on the wireless power transmitter, the wireless power transmitter may detect a larger impedance change than in a case where the wireless power receiver having the first impedance is placed on the wireless power transmitter.

Accordingly, when the wireless power receiver is placed on the wireless power transmitter, an impedance change may be large, and thus the large impedance change enables the wireless power transmitter to clearly detect the wireless power receiver. A mode in which the wireless power receiver connects the impedance change unit is referred to as a "wireless power receiver detection mode." In the wireless power receiver detection mode, the wireless power transmitter may have first wireless power transmission efficiency.

Meanwhile, the wireless power receiver may receive an impedance change command from the wireless power transmitter in step S1003. The impedance change command may be a command which releases the connection state to the impedance change unit by the wireless power receiver. The impedance change command may be received which is inserted into a response signal (i.e., a PRU response), a PTU static signal, or a PRU static signal. Alternatively, the impedance change command included in a single signal may be received.

When the wireless power receiver has received the impedance change command from the wireless power transmitter (Yes in step S1003), the wireless power receiver may release the connection of the impedance change unit in step S1005. A mode of releasing the connection of the impedance change unit may be referred to as a "wireless power transmission mode." After entering the wireless power transmission mode, the wireless power receiver may receive charging power from the wireless power transmitter.

FIG. 10B is a flowchart illustrating a control method of a wireless power receiver according to another embodiment of the present invention. The wireless power receiver may connect the impedance change unit in step S1001. The wireless power receiver may detect an impedance change condition in step S1013. When the wireless power receiver has detected the impedance change condition (Yes in step S1013), the wireless power receiver may release the connection of the impedance change unit in step S1015.

The impedance change condition may be a preset condition for releasing the connection to the impedance change unit. For example, when at least one of a temperature value, a voltage value, a current value and a power value, that at least one of the first measurement unit 908 and the second measurement unit 914 illustrated in FIG. 9 has measured, exceeds a threshold, the wireless power receiver may determine that charging starts and may enter a wireless power transmission mode. Alternatively, when receiving a preset signal from the wireless power transmitter, the wireless power receiver may determine that the wireless power receiver communicates with the wireless power transmitter and may enter the wireless power transmission mode.

The invention claimed is:

1. A control method of a wireless power transmitter for transmitting charging power to a wireless power receiver, the control method comprising:
    adjusting an internal impedance of the wireless power transmitter such that an impedance change occurring when the wireless power receiver is placed is set to a second impedance change different from a first impedance change;
    applying detection power for detecting the wireless power receiver;
    detecting the second impedance change and detecting the wireless power receiver while applying the detection power; and
    changing the impedance change occurring when the wireless power receiver is placed from the second impedance change to the first impedance change,
    wherein the second impedance change is larger than the first impedance change.

2. The control method as claimed in claim 1, wherein the adjusting of the internal impedance of the wireless power transmitter comprises connecting an impedance change unit, that changes the impedance change occurring when the wireless power receiver is placed from the first impedance change to the second impedance change, to the wireless power transmitter.

3. The control method as claimed in claim 2, wherein the connecting of the impedance change unit to the wireless power transmitter comprises controlling a switching unit connected to the impedance change unit to be in an on state.

4. The control method as claimed in claim 2, wherein the impedance change unit comprises at least one of at least one passive element and at least one active element.

5. The control method as claimed in claim 1, wherein a wireless power transmission efficiency in a case where the impedance change occurring when the wireless power receiver is placed corresponds to the second impedance change is less than a wireless power transmission efficiency in a case where the impedance change occurring when the wireless power receiver is placed corresponds to the first impedance change.

6. A wireless power transmitter for transmitting charging power to a wireless power receiver, the wireless power transmitter comprising:
    an impedance change unit that sets an impedance change occurring when the wireless power receiver is placed to one of a first impedance change and a second impedance change;
    a power transmission unit that transmits the charging power to the wireless power receiver; and
    a control unit that performs a control operation for setting the impedance change occurring when the wireless power receiver is placed to a second impedance change, applying detection power for detecting the wireless power receiver to the power transmission unit, and changing the impedance change occurring when the wireless power receiver is placed from the second impedance change to the first impedance change, when detecting the second impedance change and detecting the wireless power receiver while applying the detection power,
    wherein the second impedance change is larger than the first impedance change.

7. The wireless power transmitter as claimed in claim 6, further comprising a switching unit that connects the impedance change unit to the wireless power transmitter or releases the connection of the impedance change unit to the wireless power transmitter according to an on state or an off state.

8. The wireless power transmitter as claimed in claim 7, wherein the control unit controls the switching unit connected to the impedance change unit to be in the on state, when detecting the wireless power receiver.

9. The wireless power transmitter as claimed in claim 6, wherein the impedance change unit comprises at least one of at least one passive element and at least one active element.

10. The wireless power transmitter as claimed in claim 6, wherein a wireless power transmission efficiency in a case where the impedance change occurring when the wireless power receiver is placed corresponds to the second impedance change is less than a wireless power transmission efficiency in a case where the impedance change occurring when the wireless power receiver is placed corresponds to the first impedance change.

11. A control method of a wireless power receiver for receiving charging power from a wireless power transmitter, the control method comprising:
    setting an internal impedance of the wireless power receiver to a second impedance different from a first impedance;
    detecting an impedance change condition for changing the internal impedance of the wireless power receiver from the second impedance to the first impedance or receiving an impedance change command from the wireless power transmitter; and
    changing the internal impedance of the wireless power receiver from the second impedance to the first impedance when detecting the impedance change condition or receiving the impedance change command,
    wherein an impedance change occurring when the wireless power receiver is placed on the wireless power transmitter corresponds to a first impedance change, when the internal impedance of the wireless power receiver corresponds to the first impedance, and
    wherein an impedance change occurring when the wireless power receiver is placed on the wireless power transmitter corresponds to a second impedance change, when the internal impedance of the wireless power receiver corresponds to the second impedance, wherein the second impedance change is larger than the first impedance change.

12. The control method as claimed in claim 11, wherein the setting of the internal impedance of the wireless power receiver to the second impedance different from the first impedance comprises connecting an impedance change unit, that causes the internal impedance of the wireless power receiver in a case where the impedance change unit is connected to the wireless power receiver to be the second impedance, to the wireless power receiver.

13. The control method as claimed in claim 12, wherein the connecting of the impedance change unit to the wireless power receiver comprises controlling a switching unit connected to the impedance change unit to be in an on state.

14. The control method as claimed in claim 12, wherein the impedance change unit comprises at least one of at least one passive element and at least one active element.

15. The control method as claimed in claim 11, wherein a wireless power transmission efficiency in the case where the internal impedance of the wireless power receiver corresponds to the second impedance is less than a wireless power transmission efficiency in the case where the internal impedance of the wireless power receiver corresponds to the first impedance.

16. The control method as claimed in claim 11, wherein the impedance change condition corresponds to a condition under which at least one of a temperature value, a voltage value, a current value and a power value at a point of the wireless power receiver exceeds a threshold.

17. A wireless power receiver for receiving charging power from a wireless power transmitter, the wireless power receiver comprising:
    an impedance change unit that sets an internal impedance of the wireless power receiver to one of a first impedance and a second impedance different from the first impedance; and
    a control unit that changes the internal impedance of the wireless power receiver from the second impedance to the first impedance when detecting an impedance change condition for changing the internal impedance of the wireless power receiver from the second impedance to the first impedance,
    wherein an impedance change occurring when the wireless power receiver is placed on the wireless power transmitter corresponds to a first impedance change, when the internal impedance of the wireless power receiver corresponds to the first impedance, and
    wherein an impedance change occurring when the wireless power receiver is placed on the wireless power transmitter corresponds to a second impedance change, when the internal impedance of the wireless power receiver corresponds to the second impedance, wherein the second impedance change is larger than the first impedance change.

18. The wireless power receiver as claimed in claim 17, further comprising a switching unit that connects an impedance change unit, that causes the internal impedance of the wireless power receiver in a case where the impedance change unit is connected to the wireless power receiver to be the second impedance, to the wireless power receiver.

19. The wireless power receiver as claimed in claim 18, wherein the control unit controls the switching unit connected to the impedance change unit to be in an on state.

20. The wireless power receiver as claimed in claim 17, wherein the impedance change unit comprises at least one of at least one passive element and at least one active element.

21. The wireless power receiver as claimed in claim 17, wherein a wireless power transmission efficiency in the case where the internal impedance of the wireless power receiver corresponds to the second impedance is less than a wireless power transmission efficiency in the case where the internal impedance of the wireless power receiver corresponds to the first impedance.

22. The wireless power receiver as claimed in claim 17, wherein the impedance change condition corresponds to a condition under which at least one of a temperature value, a voltage value, a current value and a power value at a point of the wireless power receiver exceeds a threshold.

23. A wireless power receiver for receiving charging power from a wireless power transmitter, the wireless power receiver comprising:
    an impedance change unit that sets an internal impedance of the wireless power receiver to one of a first impedance and a second impedance different from the first impedance;
    a communication unit that receives, from the wireless power transmitter, an impedance change command which changes the internal impedance of the wireless power receiver from the second impedance to the first impedance; and
    a control unit that changes the internal impedance of the wireless power receiver from the second impedance to the first impedance when the impedance change command is received,
    wherein an impedance change in the wireless power transmitter occurring due to placement of the wireless power receiver on the wireless power transmitter corresponds to a first impedance change, when the internal impedance of the wireless power receiver corresponds to the first impedance, wherein the impedance change in the wireless power transmitter occurring due to placement of the wireless power receiver on the wireless power transmitter corresponds to a second impedance change, when the internal impedance of the wireless power receiver corresponds to the second impedance, and wherein the second impedance change is larger than the first impedance change.

24. A wireless power transmitter for transmitting charging power to a wireless power receiver, the wireless power transmitter comprising:

- a power transmission unit that transmits the charging power to the wireless power receiver;
- a control unit that applies detection power for detecting the wireless power receiver to the power transmission unit, and detects an impedance change and detects the wireless power receiver for a period during which the detection power is applied; and
- a communication unit that transmits an impedance change command which changes an internal impedance of the wireless power receiver from a second impedance to a first impedance different from the second impedance, when the wireless power receiver has been detected, wherein the impedance change occurring due to placement of the wireless power receiver on the wireless power transmitter corresponds to a first impedance change, when the internal impedance of the wireless power receiver corresponds to the first impedance, wherein the impedance change occurring due to placement of the wireless power receiver on the wireless power transmitter corresponds to a second impedance change, when the internal impedance of the wireless power receiver corresponds to the second impedance, and wherein the second impedance change is larger than the first impedance change.

25. A control method of a wireless power transmitter for transmitting charging power to a wireless power receiver, the control method comprising:

- applying detection power for detecting the wireless power receiver;
- detecting an impedance change and detecting the wireless power receiver for a period during which the detection power is applied; and
- transmitting an impedance change command which changes an internal impedance of the wireless power receiver from a second impedance to a first impedance different from the second impedance, when the wireless power receiver has been detected, wherein the impedance change occurring due to placement of the wireless power receiver on the wireless power transmitter corresponds to a first impedance change, when the internal impedance of the wireless power receiver corresponds to the first impedance, wherein the impedance change occurring due to placement of the wireless power receiver on the wireless power transmitter corresponds to a second impedance change, when the internal impedance of the wireless power receiver corresponds to the second impedance, and wherein the second impedance change is larger than the first impedance change.

* * * * *